United States Patent [19]

Janniere

[11] Patent Number: 5,402,095
[45] Date of Patent: Mar. 28, 1995

[54] PORTABLE CASE FOR AN ELECTRONIC SMART CARD

[75] Inventor: Alain Janniere, Paris, France

[73] Assignees: ITT Composants et Instruments, Bagneux; Gemplus Electronics, La Ciotat, both of France

[21] Appl. No.: 946,991

[22] Filed: Sep. 16, 1992

[30] Foreign Application Priority Data

Sep. 20, 1991 [FR] France .................. 91 11650

[51] Int. Cl.⁶ .................. G06K 7/00; B65D 43/20
[52] U.S. Cl. .................. 235/441; 235/486; 200/292; 200/505; 206/39.6; 220/348; 361/737
[58] Field of Search .............. 235/441, 486, 492, 479; 200/292, 505, 512, 517; 206/39.4, 39.6, 449, 555; 220/306, 345, 346, 348; 361/737

[56] References Cited

U.S. PATENT DOCUMENTS

| | | | |
|---|---|---|---|
| 4,551,586 | 11/1985 | Latasiewicz | 200/512 |
| 4,602,351 | 7/1986 | Shimamura et al. | 235/441 |
| 4,620,075 | 10/1986 | La Belle et al. | 200/512 |
| 4,671,289 | 6/1987 | Gainsley et al. | 200/505 |
| 4,835,375 | 5/1989 | Shimamura et al. | 235/474 |
| 4,898,195 | 2/1990 | Sussman | 220/346 |
| 5,055,970 | 10/1991 | Weihs | 235/486 |
| 5,065,004 | 11/1991 | Mizuno et al. | 235/479 |

FOREIGN PATENT DOCUMENTS

| | | |
|---|---|---|
| 0350509 | 11/1988 | European Pat. Off. . |
| 0333530 | 2/1989 | European Pat. Off. . |
| 0360345 | 9/1989 | European Pat. Off. . |
| 2636153 | 9/1988 | France . |
| 2651592 | 3/1991 | France ............... 235/486 |
| 2653249 | 4/1991 | France . |
| 3632294 | 4/1988 | Germany . |
| 3916783 | 4/1990 | Germany ............ 235/441 |
| 1-76384 | 3/1989 | Japan ............... 235/441 |
| 64-82194 | 3/1989 | Japan . |
| 2-54389 | 2/1990 | Japan ............... 235/486 |
| WO8804458 | 6/1988 | WIPO . |
| 91/01096 | 2/1991 | WIPO ............... 206/39.6 |

Primary Examiner—Davis L. Willis
Assistant Examiner—Edward H. Sikorski
Attorney, Agent, or Firm—Thomas L. Peterson

[57] ABSTRACT

The invention proposes a portable case for an electronic smart card (C), comprising, on one of its main faces, electrical contact bands connected to an integrated circuit containing the card memory, of the type in which provision is made for a compartment which receives the card (C) and connection means (72) for connecting the contact bands to an exploitation electronic circuit providing at least a function of reading the data contained in the card, characterized in that it comprises a casing (10, 12, 14) equipped with a window (22) permitting the insertion of the card (C), an electrical connector (72) whose electrical contact elements (73) interact with the said contact bands when the card is in the position of exploitation of the data, a device for emitting and receiving (112, 114) data towards and from an information-processing station, and a switch (120) for detecting the placing of the card (C) in an exploitation position in the casing (10).

2 Claims, 6 Drawing Sheets

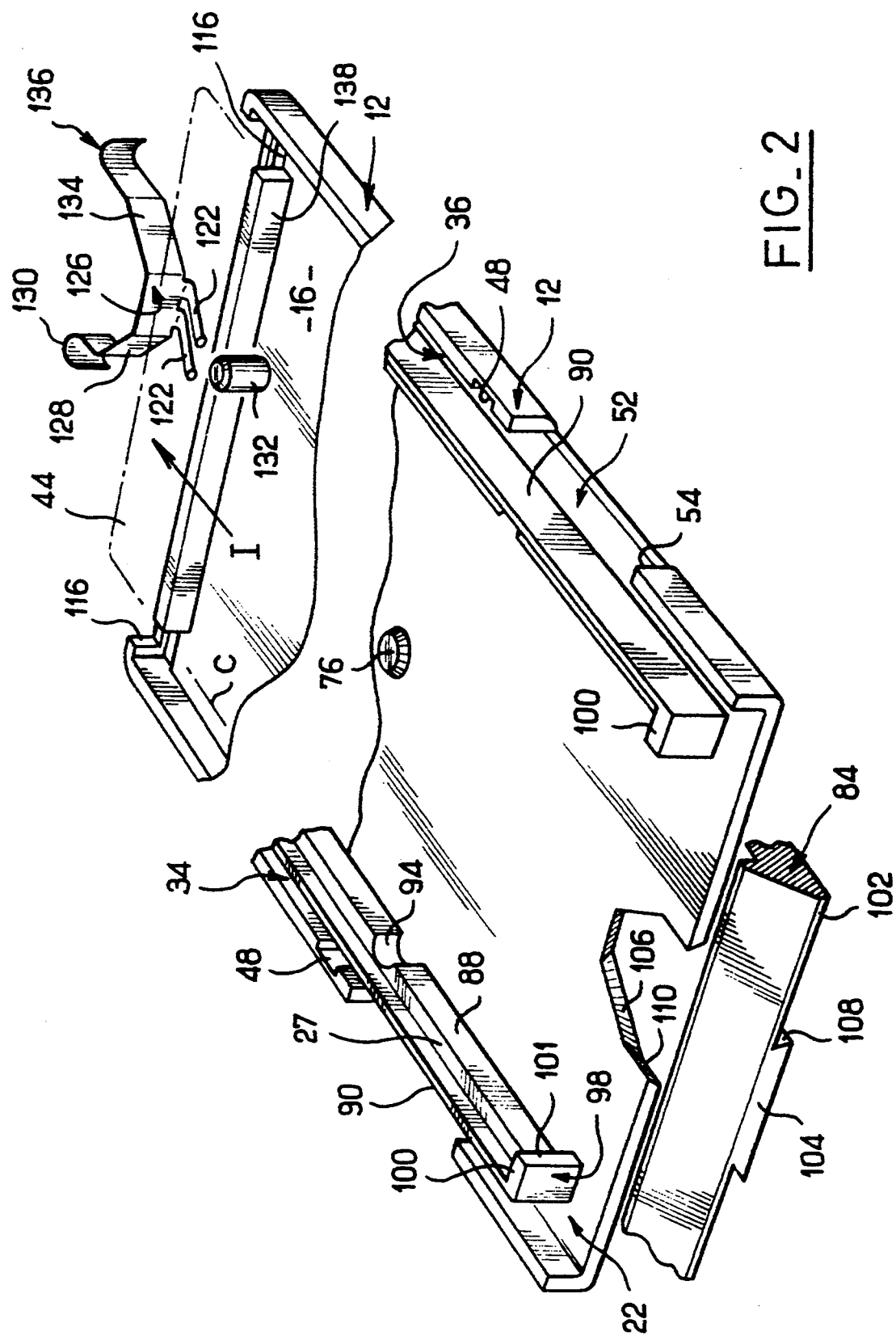
FIG_2

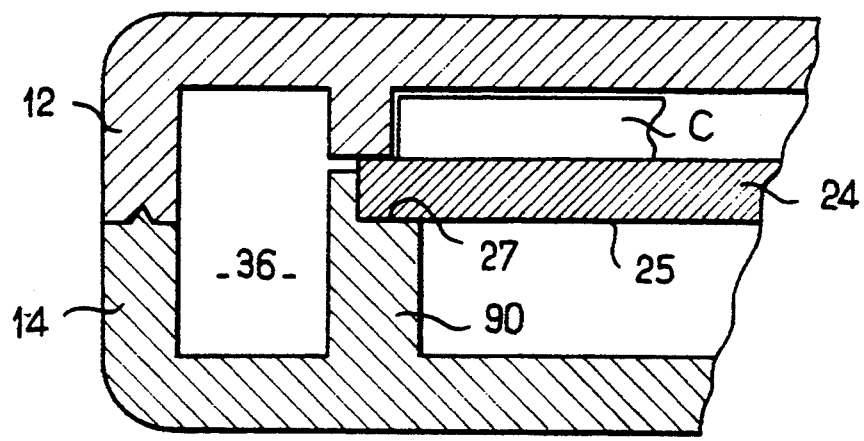
FIG_3
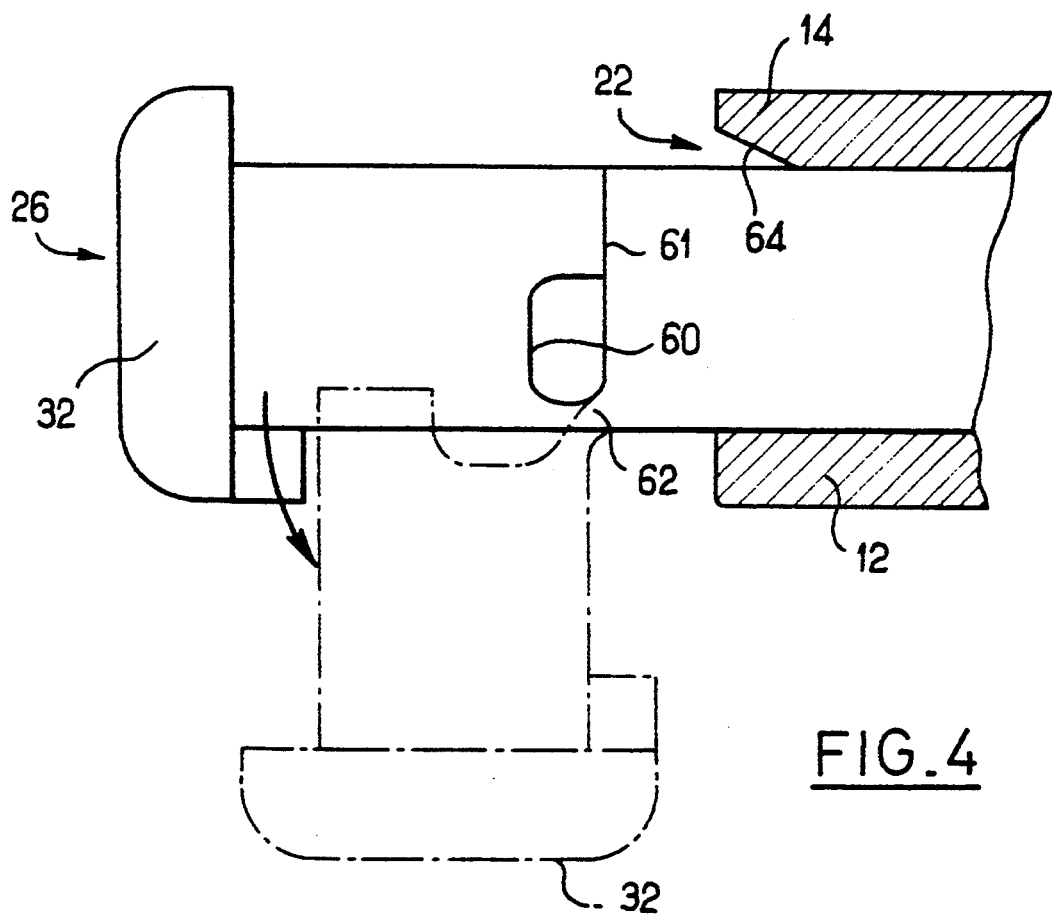
FIG_4

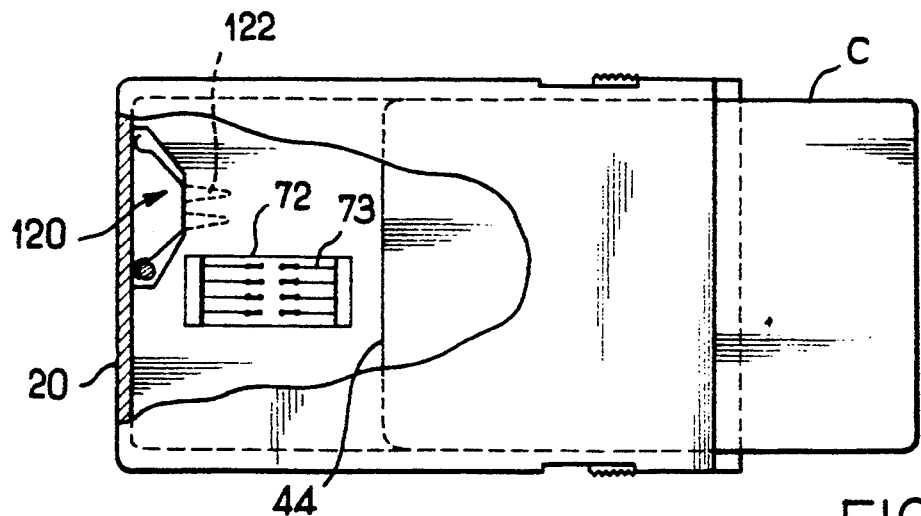
FIG_7
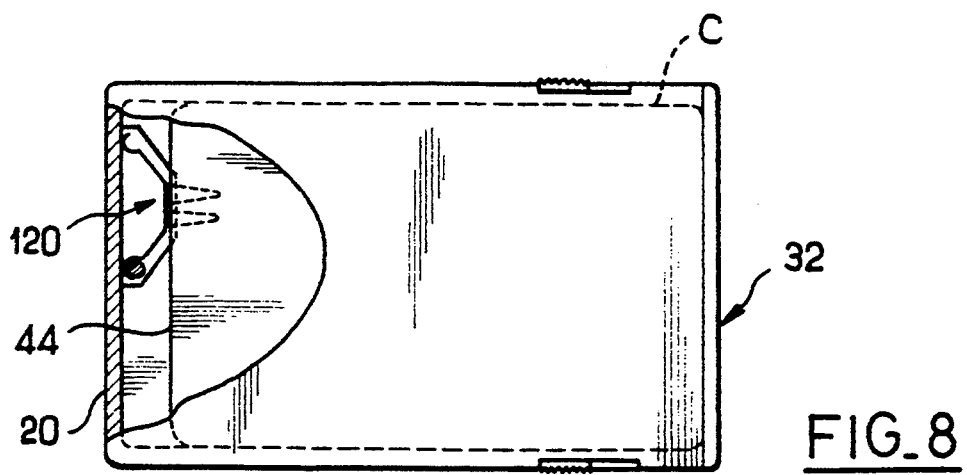
FIG_8
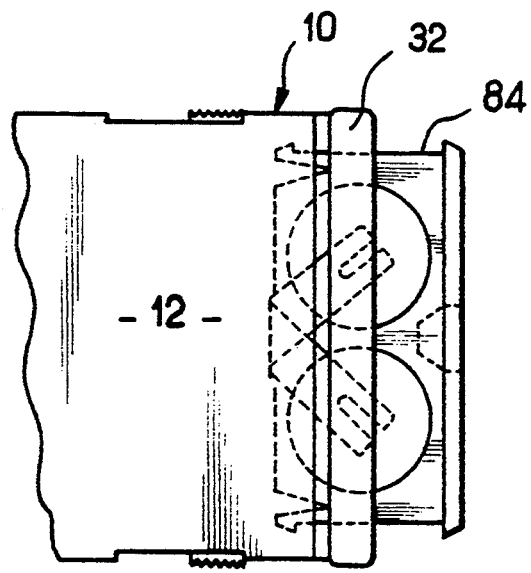
FIG.9

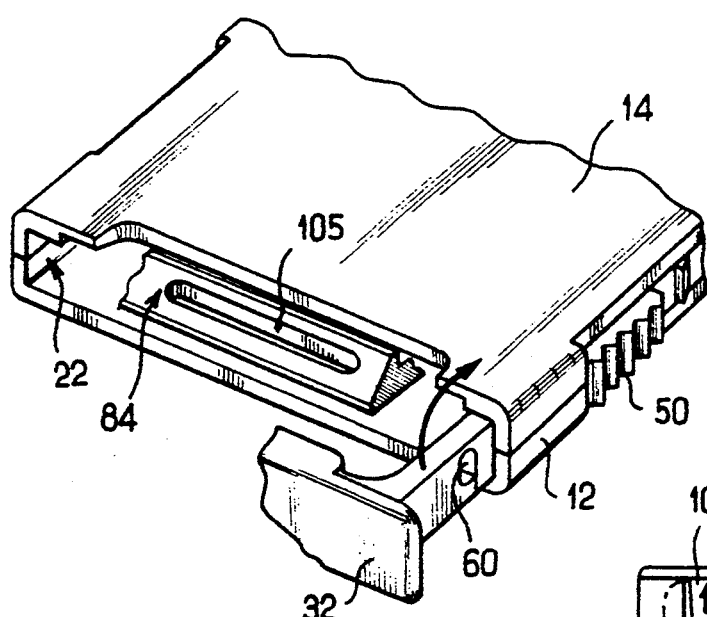
FIG_10
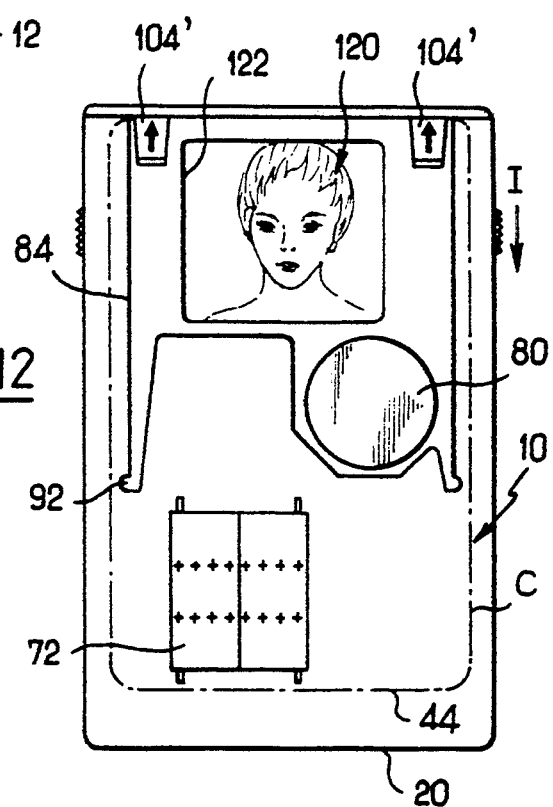
FIG_12
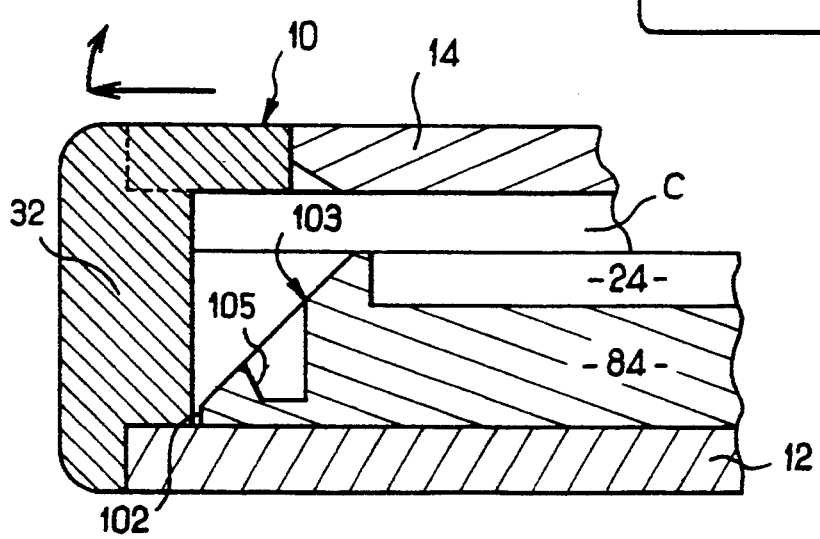
FIG_11

PORTABLE CASE FOR AN ELECTRONIC SMART CARD

The present invention relates to a portable case for an electronic smart card.

It relates more particularly to a case of the type described and shown in document FR-A-2,653,249, in which provision is made for connection means between the integrated circuit of the card and an exploitation electronic circuit via reading of data contained in the card memory.

However, it will be observed that this document describes only the design principle of such a case, without offering an embodiment thereof which can be exploited industrially and commercially. It will be noted, in this connection, that the sole function of reading the data memorised in the card, proposed by this document, is practically of no use, since it is usually performed, during use of the card, by the receiving apparatus which immediately informs its possessor of the condition of the main parameter stored, such as, for example, the available credit in the case of a telephone payment card used in public telephones.

The object of the invention is to propose a portable case whose design makes it possible, in particular, to ensure the remote exchange of information between the case and a receiving station. Such a function is, in particular, applicable to the control of access of persons into a building, in a public transport means, or to the control of access of a vehicle to a toll road, this being without the user of the card having to insert it directly into a card-reading terminal.

The portable case must also be extremely small and make it possible to change the card contained in the case as easily as possible together with a high degree of reliability in use which requires, in particular, the assurance that the closure of the case is as leaktight as possible.

To this end, the invention proposes a portable case of the type mentioned above, characterised in that it comprises a casing equipped with a window permitting the insertion of the card, an electrical connector whose electrical contact elements interact with the contact bands of the card when the latter is in the position of exploitation or readin and readout of the data, a device for emitting and receiving data towards and from an information-processing station, and a switch for detecting the placing of the card in an exploitation position in the casing.

According to further characteristics of the invention:

the casing has a general rectangular parallelepipedal shape which is substantially equivalent to that of the card, of which one of the small faces comprises a window through which a drawer, which delimits the compartment for receiving the card, can slide between an exit position in which the card can be placed in the compartment and a return position in which the card is in the exploitation position inside the casing;

the case comprises stop means arranged between the casing and the drawer in order to limit the exit travel of the latter and means for locking the drawer in the return position;

the case comprises a printed circuit board disposed in the casing opposite the main face of the card and which receives the electrical connector and the exploitation electronic circuit;

the switch for detecting the placing of the card is a member mounted movably inside the casing between a rest position and a detection position in which a conducting branch of the member interacts with two tracks formed on the board in order to open or close a detection circuit, the displacements of the movable member being generated against an elastic return force towards its rest position, via the interaction of a lateral edge of the card with a branch for driving the member;

the elastic return force is exerted by at least one branch of the movable member which bears on a corresponding surface of the casing;

the free end of the card drawer which projects outside the casing in the exit position comprises a transverse face forming a shutter which closes off the window when the drawer is in the return position;

the transverse face of the drawer forming the shutter is mounted in an articulated manner about a spindle perpendicular to the direction of sliding of the drawer between a closing-off position and a retracted position in order to permit the placing of the card in the compartment by inserting it into the latter in a direction parallel to the plane of the card;

the drawer is produced in the form of a frame comprising at least two lateral legs connected together via a transverse leg and portions for retaining the card which are formed on the lateral legs of the frame;

the case comprises an auxiliary drawer arranged parallel to the drawer which receives the card and in which is received at least one battery for supplying the casing with electrical power;

the two card and battery drawers are arranged, respectively, on either side of the board and can slide outside the casing via one and the same window;

the transverse face of the drawer of the card forming the shutter constitutes a trap-door for access to the battery drawer;

the case comprises a control contact, for example for triggering the emission of a signal, whose actuation is obtained via elastic deformation of one of the faces of the casing;

the components of the case arranged opposite the main face of the card comprise openings and/or windows arranged opposite a specific zone of the card in order to identify, from outside the case, a pictogram appearing on this zone.

Further characteristics and advantages of the invention will become apparent on reading the detailed description which follows, for the understanding of which reference will be made to the appended drawings, in which:

FIG. 2 is a perspective of the inner face of one of the two half-casings of the case, with the case being shown upside-down from FIG. 1;

FIG. 3 is a partial view of the case in transverse section;

FIG. 4 is a lateral view of the front part of the case, illustrating the articulation of the closing-off shutter with the case shown upside-down from FIGS. 1 and 3;

FIGS. 7 and 8 are diagrammatic views illustrating the operation of the detection switch;

FIG. 9 is a partial plan view of the casing illustrating the battery drawer in the exit position;

FIG. 10 is a perspective view of a variant embodiment of the front part of the portable case;

FIG. 11 is a view similar to that of FIG. 5, corresponding to the variant embodiment of FIG. 10; and FIG. 12 is a diagrammatic plan view illustrating a further variant embodiment of the portable case.

Figure 1:
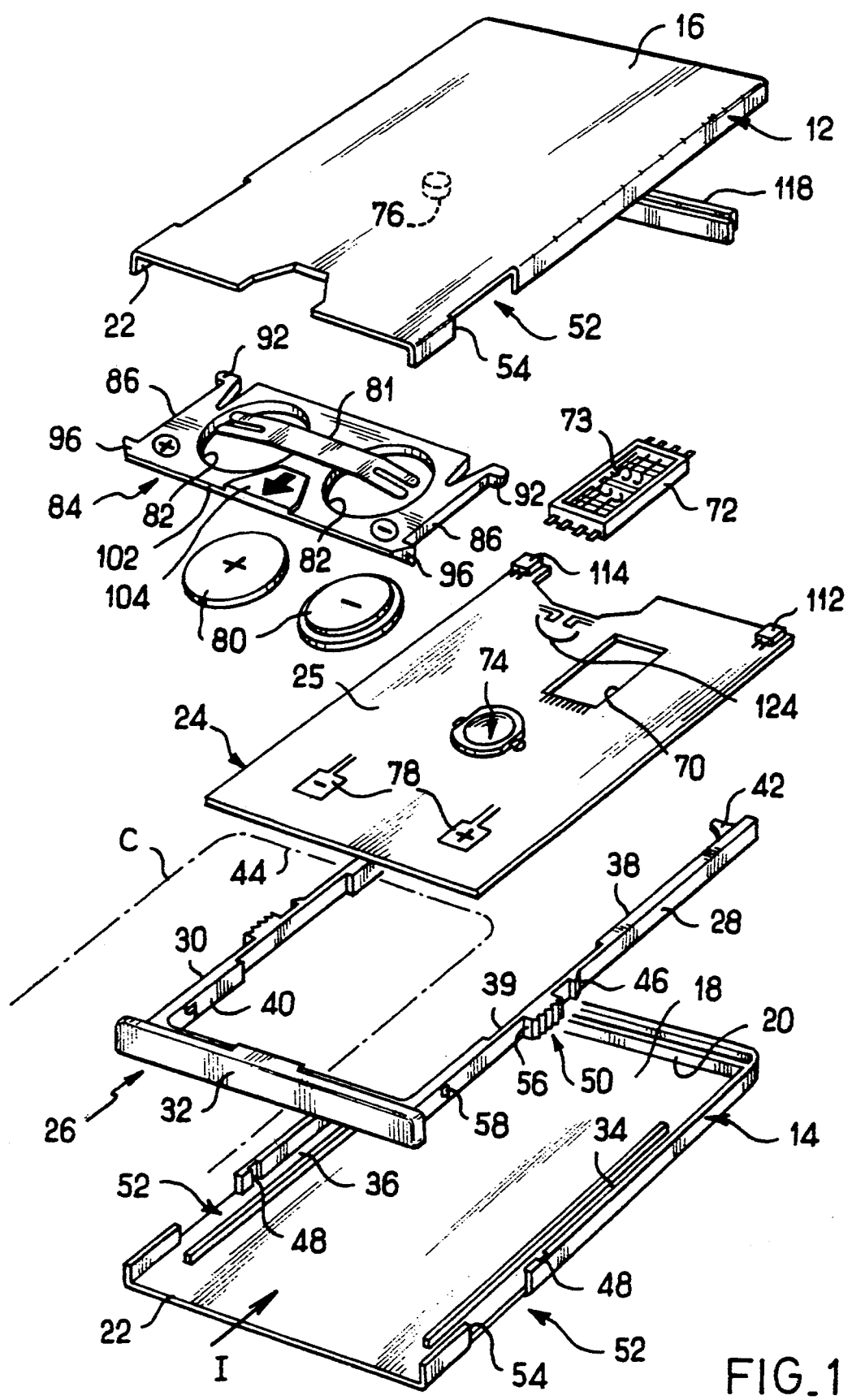
FIG. 1 is an exploded view in perspective which diagrammatically illustrates the various components of a portable case produced in accordance with the teachings of the invention.

The portable case illustrated in the figures is composed essentially of a casing 10 of rectangular parallelepipedal shape with dimensions which are substantially homothetic with those of an electronic smart card C which conforms to the ISO standard.

The casing 10 is, for example, produced from two half-casings 12 and 14 whose joining plane extends substantially at mid-height of the casing. For purposes of discussion, the half-casing 12 may be considered the lower or bottom one and the half-casing 14 may be considered the top one, as this is the orientation shown in FIGS. 2 and 4–6. Of course, the case can be used in any orientation relative to gravity.

The casing comprises two plane main walls 16 and 18, parallel to the main faces of the card C, and three lateral faces, of which the smallest, corresponding to the width of the card delimits a back 20 which extends in a plane perpendicular to the direction I of insertion of the card C. The plane main walls 16, 18 lie in substantially parallel planes, and the card C lies substantially in a plane (which is halfway between the top and bottom card faces) which is parallel to the main walls.

The lateral small face opposite the back 20 is absent in order to delimit a window 22 for the insertion of the card into the case.

The casing comprises a printed circuit board 24 which extends substantially over the entire surface of the casing and which is held in place parallel to the faces 16 and 18, between the 2 half-casings 12 and 14, by being held laterally in an indentation 27 of a partition 90 of the half-casing 14.

In accordance with the appearance of the invention, the placing of the card C inside the casing 10 is effected by means of a card drawer 26.

The drawer 26 is produced in the form of a frame consisting of two symmetrical legs 28 and 30 connected together by a crosspiece 32.

The legs 28 and 30 form slides which are received in corresponding slideways 34 and 36 formed partly on the inner face of the half-casing 14 in order to permit sliding of the drawer 26 in a direction parallel to the direction I of insertion of the card.

The opposing inner faces 38 and 40 of the legs or longitudinal members 28 and 30 comprise plane portions 42 which extend parallel to the sliding plane in order to delimit a compartment in the drawer 26 which receives the card C.

As may be seen in FIG. 1, the frame of the drawer 26 does not comprise a back, that is to say a transverse leg opposite the back 20 of the casing, and this is in order to permit the interaction of the front free edge 44 of the card C with a member of a switch for detecting the presence of a card, as will be explained below.

The crosspiece 32 is connected to the free ends of legs 28 and 30 which are able to exit from the casing 10 via the window 22. The crosspiece 32 constitutes the lateral face for leaktight closing-off of this window 22 when the drawer is in its return position in the casing 10 (see FIG. 5).

Locking of the drawer 26 in the return position is ensured by snugs 46 formed on the outer lateral faces of the longitudinal legs 28 and 30 which are received in corresponding notches 48 formed in the two longitudinal lateral faces of the casing 10.

Unlocking, in order to make it possible to bring the drawer 26 into the exit position, is effected by virtue of relief parts forming buttons 50 which are accessible through notches 52, from the outside of the casing, and on which the user can act from the outside in order slightly to deform the legs 28 and 30 inwards and thus release the snugs 46 from the notches 48.

This elastic deformation of the legs 38 and 40 is made possible by the recess 39 of the corresponding part of the legs, which results in an elastically deformable thinned portion.

The length of the notches 52, in the direction I, determines the sliding travel of the drawer 26 towards its exit position via the interaction of the front edge 56 of the button 50 with the front vertical edge 54 of the corresponding notch 52.

The exit position of the drawer 26 is such that it is located only partially outside the casing 10 in this position.

In order to facilitate the insertion of the card C into the housing delimited by the lateral legs 28 and 30, without having to deform the card, the front transverse face 32 of the drawer is mounted in an articulated manner about a pivoting spindle 58 perpendicular to the direction I of sliding.

According to the embodiment shown diagrammatically in FIGS. 1 and 4, the frame, is, for example, produced by moulding as a single piece, and a recess 60 as well as a slot 61 delimit a thinned portion 62 in order to constitute a hinge for articulation of the shutter 32 about the spindle 58.

The front face or shutter 32 may thus pivot between its closed position in which it extends in a plane perpendicular to the direction I of sliding and a retracted position (shown in dot-dash lines in FIG. 4) 32' in which it is parallel to the plane of the drawer 26 and thus clears the window 22 in order to permit insertion of the card into the compartment of the drawer. In the exit or open position of the drawer, the card can be installed by inserting it in a direction parallel to the plane of the card without having to deform it. This operation is facilitated by a bevel 64 formed on the front free edge of the face 18 of the half-casing 14.

The board 24 comprises, in particular, an electronic circuit and its components (not shown) for exploitation of the data contained in the card C.

The board comprises a recess 70 for fitting a connector 72 whose contact elements 73 are provided in order to interact with the conducting points or tracks of the corresponding main face of the card C.

The conducting face 25 of the printed circuit board 24 also comprises a controlled electrical contact element or switch means 74 which can be actuated from the outside of the case 10 by elastically deforming the opposite face 16 of the casing, which comprises a snug 76.

The face 25 of the board 24 also comprises conducting poles 78 for the connection of batteries 80 contained in the casing.

In order to permit their replacement, the batteries 80 are fitted into two receptacles 82 formed in a battery drawer 84.

The battery drawer 84 is fitted so as to slide in the casing 10 from which it can exit via the window 22.

To this end, the drawer 84 comprises two longitudinal edges 86 which slide between the opposing inner faces 88 of the partitions 90 which delimit the slideways 34 and 36 on the inside (see FIG. 2).

As shown in FIGS. 1 and 2, the battery drawer edges 86 comprise, at the rear, tabs 92 for locking the battery drawer in the return position which are received in notches 94 produced in the faces 88 of the partitions 90.

The edges 86 comprise, at the front, snugs 96 which interact with the front ends 98 of the partitions 90 in order to define the return position of the battery drawer.

The exit position of the drawer 84 is defined by the interaction of the free ends of the tabs 92 with the transverse portions 100 of the ends 98 of the partitions 90.

Guiding during sliding of the battery drawer 84 is thus effected on each side at two contact points constituted by the ends of the tabs 92 which interact with the faces 88 and the edges 86 which are guided between the opposing faces 101 of the transverse portions 100 of the ends 98 of the partitions 90.

In the return position, the front edge 102 of the drawer 84 is concealed by the shutter 32 of the card drawer 26 and it is thus necessary to open the latter before the battery drawer 84 can exit.

The front edge 102 of the battery drawer also comprises a bevel 103 which, interacting with the bevel 64, imposes on the card C a path for placing it in the compartment of the drawer.

In order to facilitate removal of the batteries, a face of the drawer comprises a relief part 104 which is accessible via a notch 106 of complementary profile formed in the front face 16 of the half-casing 12.

The part 104 and the notch 106 can also have dovetail profiles 108–110 in order to oppose the force applied on the two half-casings by the conducting blade 81 which connects the batteries and which, in the return position of the battery drawer, bears on the inner face of the half-casing 12, stressing the latter away from the half-casing 14.

The board 24 also comprises means for the emission and reception of signals.

These means may be radioelectric and, in this case, comprise an antenna formed directly on the face 25 of the board 24.

Transmission means may also be produced in the form of infrared means and they then comprise an infrared emitter 112 and an infrared receiver 114 which are arranged on the board 24 so as to be located opposite openings 116 formed in the back 20 which is supplemented by a closure element 118 which is infrared-transparent.

The casing 10 finally comprises a switch for detecting the presence of a card C in the exploitation position in the casing.

This switch is produced in the form of a member 120 made from conducting material.

It comprises two contact branches 122 which can interact with two tracks 124 formed on the face 25 of the board 24 in order to establish or break a detection circuit.

The branches 122 are substantially parallel to the plane of the card and are connected to a control or drive branch 126 with which the front edge 44 of the card C interacts in order to generate the displacement of the branches 122.

The control branch 126 is extended towards the back of the casing by a hooking branch 128 whose end 130 is folded into a loop in order to be received with play around a holding lug 132 formed on the inner face of the half-casing 12.

The control branch 126 is extended by a return branch 134 which is symmetrical with the branch 128 and of which the convex part of the end 136 bears against the face 138 of the back 20 of the casing.

The two branches 128 and 134 are elastically deformable so as, on the one hand, to elastically return the control branch 126 towards a rest position, in the absence of a card, and in order, on the other hand, to constitute a spring for taking up amounts of play, which spring stresses the card C, making it bear against an opposing surface of the front face 32 of the drawer 26, and which thus indirectly stresses the edges 56 of the buttons 50 against the edges 54 of the notches 52.

The member 120 thus also acts as an anti-noise spring for the movable components of the case.

Owing to the hooking of the member 120 on the lug 132, the contact branches are displaced relative to the board 24 in a direction which is slightly inclined relative to the direction I.

When it is desired to replace the card C, the card to be replaced is driven to an exit position by the portions 42 which interact with the front edge 44, during the exit movement of the drawer 26.

The variant embodiment illustrating FIGS. 10 and 11 will now be discribed.

Figure 5:
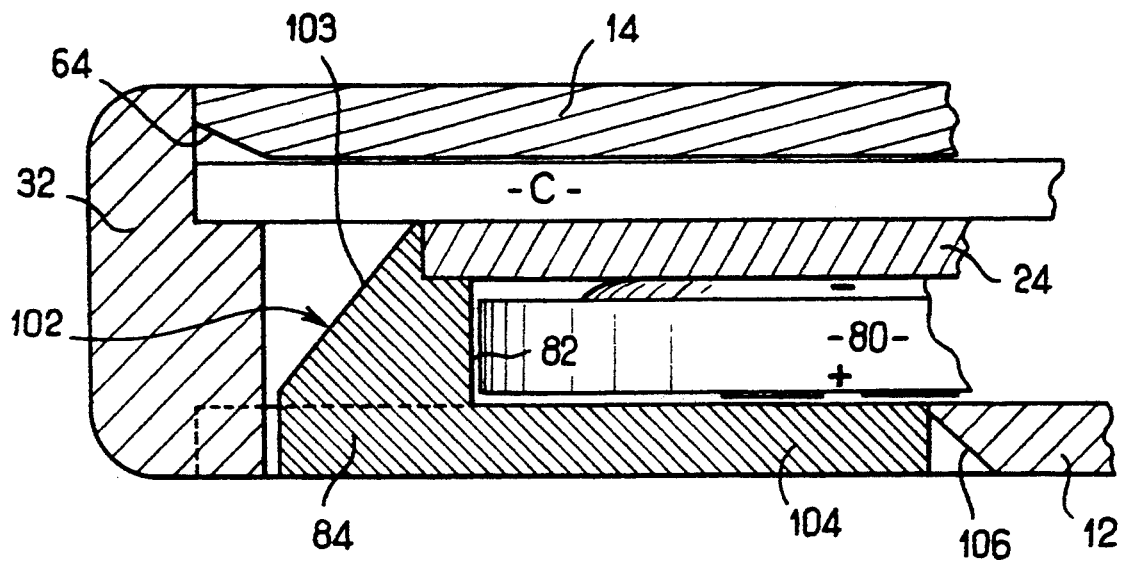
FIG. 5 is a diagrammatic view in partial section via a longitudinal median plane of the front part of the case with the case shown upside-down from FIGS. 1 and 3.
Figure 6:
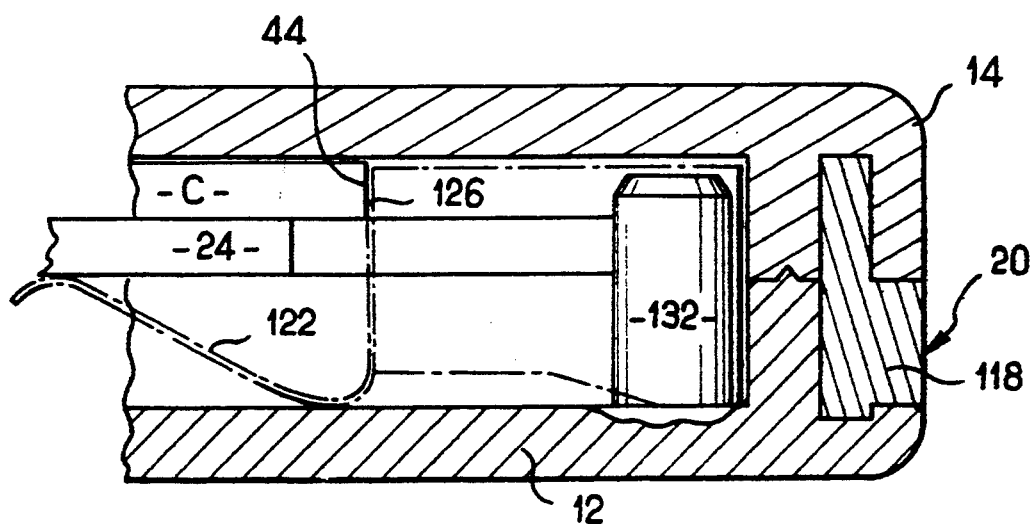
FIG. 6 is a partial view in longitudinal section via a plane passing through the retention lug of the contact member of the detection switch.

As may be seen, by comparison with FIGS. 1 and 5, the direction of pivoting of the face 32 is the reverse of that of the preceding embodiment, so that the face 32 comes above the half-casing 14 when considering FIGS. 10 and 11.

The battery drawer 84 is, here, entirely concealed inside the casing 10 when the card drawer is closed and its front edge comprises, in the insertion bevel 103, a housing 105 enabling it to be pulled into the exit position.

The variant embodiment shown diagrammatically in FIG. 12 relates to an application of a portable case according to the invention which may be used by a person as an identity badge.

In effect, provision is made for production of cards whose face which comprises the connection bands also comprises, in a specific zone of this face, an identification pictogram such as, for example, the photo of the bearer of the card.

With the aid of this card, the person will be able, for example, to gain access to certain zones with restricted access whose opening will be generated automatically by the emission and reception means of the case which may be hooked on to a garment of the user in order to constitute a personal identity badge for the user.

It is thus necessary, for this application, to provide means making it possible to display the pictogram or the photo from outside the case.

To this end, the half-casing 12 must comprise a transparent part opposite the zone 120 of the card. The battery drawer 84 must comprise a window 122 opposite the zone 120 and the printed circuit board 24 must, of course, also comprise an opposing window or opening.

In order to be able to produce the window 122 in the battery drawer 84, it will be observed, in FIG. 12, that the drawer has a length in the direction I greater than that which it has in the preceding embodiment, there being, here, Just one battery 80 arranged at the rear part of the drawer 84.

Similarly, the sole central relief part 104 may be divided into two zones 104' arranged on either side of the window 122.

If the printed circuit card were to comprise a pictogram on the face opposite that of its main face on which the connection tracks are provided, it would, of course, be sufficient to provide a single window in the corresponding half-casing opposite the zone which it is desired to see through the casing from the outside.

In the terms of the invention, the phrase "emitting and receiving device" is not restricted to means of transmission via light or radio waves, but also includes means for data exchange with a user which consist, for example, of a data-input keyboard and of a user-readable data-display screen.

Such data exchange means make it possible, in particular, to implement the invention for payment operations using a payment cash card.

I claim:

1. A portable case for receiving an electronic smart card that lies substantially in a plane and that stores information, and for transmitting information to and/or from the card, wherein the case is thin and has a width and length of the same magnitude as that of the card, comprising:

a casing which has top and bottom walls lying in spaced substantially parallel planes, opposite sides, and forward and rearward ends;

a circuit board mounted in said casing between said top and bottom walls;

a card drawer lying in said casing between said circuit board and said top casing wall, said card drawer being slidable in a forward direction to receive a card and being slidable rearwardly to a position where substantially all of said drawer lies between said top and bottom casing walls;

said drawer has a front crosspiece and opposite side legs, but is substantially devoid of any wall portion that can position said card to orient it parallel to said top and bottom walls, so when said card lies in said drawer its top and bottom are closely sandwiched between said circuit board and said casing top wall, whereby to minimize the thickness of the portable case;

said casing bottom wall has an upstanding side wall at either side of said casing, and has a rearwardly elongated upstanding partition (90) slightly spaced inwardly from each sidewall, to leave a slideway (34, 36) between each upstanding side wall and an adjacent partition;

each of said drawer side legs is free of attachment to the other at locations between said partitions, and each of said legs is closely slidably received in a corresponding one of said slideways;

each of said partitions has an indentation (27) extending in a direction along its length with the bottom of the indentation spaced from said casing bottom wall, and said circuit board has opposite side edges lying in said indentations to thereby space opposite edges of the bottom of said circuit board from said casing bottom wall to leave a space between them.

2. A portable case for receiving an electronic smart card that lies substantially in a plane and that stores information, and for transmitting information to and/or from the card, wherein the case is thin and has a width and length of the same magnitude as that of the card, comprising:

a casing which has top and bottom walls lying in spaced substantially parallel planes, opposite sides, and forward and rearward ends;

a circuit board mounted in said casing between said top and bottom walls;

a card drawer lying in said casing between said circuit board and said top casing wall, said card drawer being slidable in a forward direction to receive a card and being slidable rearwardly to a position where substantially all of said drawer lies between said top and bottom casing walls;

said drawer has a front crosspiece and opposite side legs, but is devoid of wall portions that can position said card to orient it parallel to said top and bottom walls, so when said card lies in said drawer its top and bottom are closely sandwiched between said circuit board and said casing top wall, whereby to minimize the thickness of the portable case;

said casing has an upstanding side wall at either side of said casing, and has a rearwardly-elongated upstanding partition (90) slightly spaced inwardly from each sidewall, to leave a slideway (34, 36) between each upstanding side wall and an adjacent partition, with each partition forming a card guide which slidably guides said card in movement into said casing;

each of said drawer side legs is free of attachment to the other at locations between said partitions, and each of said legs is closely slidably received in a corresponding one of said slideways.

* * * * *